United States Patent
Rowland et al.

(10) Patent No.: US 9,395,034 B1
(45) Date of Patent: *Jul. 19, 2016

(54) EQUIPMENT PAD THAT INCLUDES ONE OR MORE RISERS

(75) Inventors: Jay F. Rowland, Johns Creek, GA (US); Craig M. Harrison, Gulf Breeze, FL (US)

(73) Assignee: J.F.R. Enterprises, Inc., Johns Creek, GA (US)

( * ) Notice: Subject to any disclaimer, the term of this patent is extended or adjusted under 35 U.S.C. 154(b) by 504 days.

This patent is subject to a terminal disclaimer.

(21) Appl. No.: 13/017,148

(22) Filed: Jan. 31, 2011

Related U.S. Application Data

(63) Continuation-in-part of application No. 11/833,298, filed on Aug. 3, 2007, now Pat. No. 7,891,635.

(60) Provisional application No. 60/821,414, filed on Aug. 4, 2006.

(51) Int. Cl.
  *B65D 19/38* (2006.01)
  *F16M 11/22* (2006.01)

(52) U.S. Cl.
  CPC .................................. *F16M 11/22* (2013.01)

(58) Field of Classification Search
  CPC .......... F16M 5/00; F16M 13/00; E02D 27/01; F16B 5/0225; A45B 2023/0012; B65D 2519/00004; B65D 2519/00009; B65D 2519/00014; B65D 2519/00258; F16L 3/24
  USPC ................. 248/678, 188.2, 346.02, 346.01; 220/571; 108/57.28, 901, 53.3, 53.1, 108/51.11, 57.1, 57.17
  See application file for complete search history.

(56) References Cited

U.S. PATENT DOCUMENTS

| D32,575 S | 4/1900 | Stevenson |
|---|---|---|
| 1,487,065 A | 3/1924 | Irons |

(Continued)

FOREIGN PATENT DOCUMENTS

| AU | 2006100199 A4 | 4/2006 |
|---|---|---|
| DE | 2650288 | 3/1978 |

(Continued)

OTHER PUBLICATIONS

Non-final Office Action and Notice of References Cited, mailed for U.S. Appl. No. 11/320,992 on Apr. 10, 2008.

(Continued)

*Primary Examiner* — Terrell McKinnon
*Assistant Examiner* — Michael McDuffie
(74) *Attorney, Agent, or Firm* — Sutherland Asbill & Brennan LLP

(57) ABSTRACT

An equipment pad includes a base and a plurality of riser portions. The base includes a base surface that extends laterally outward and a base opening formed completely through the base surface. Each riser portion includes a top surface, a side wall, and an interior. The top surface is substantially level and continuous. The side wall tapers inward and extends upward from the base surface, elevating the top surface portion above the base surface. The interior, defined between the top surface and the side wall, is substantially hollow. The riser portions together define a single, continuous riser, at least one of the riser portions forming an angle with reference to an adjacent riser portion such that the riser includes at least one turn. The riser top surfaces together define a substantially level support surface for receiving the equipment unit, and the riser interiors align with the base opening so that the equipment pad is stackable.

11 Claims, 10 Drawing Sheets

(56) References Cited

U.S. PATENT DOCUMENTS

| | | |
|---|---|---|
| 1,584,175 A | 5/1926 | Irons |
| 1,915,849 A | 6/1933 | Crimmel et al. |
| 2,544,743 A | 3/1951 | Vrabcak |
| 2,583,443 A * | 1/1952 | Perry et al. ................... 108/51.3 |
| 2,934,003 A | 4/1960 | Ladymon |
| 3,330,228 A * | 7/1967 | Donnelly ................... 108/57.27 |
| 3,446,692 A * | 5/1969 | Turnbull ...................... 428/120 |
| 3,480,178 A | 11/1969 | Morgan |
| 3,724,233 A | 4/1973 | Pugh et al. |
| 3,788,581 A | 1/1974 | Rutzick |
| 3,790,115 A | 2/1974 | Fox |
| 3,848,546 A * | 11/1974 | Lawlor ...................... 108/57.28 |
| 4,050,659 A | 9/1977 | McCannon et al. |
| 4,103,857 A * | 8/1978 | Levenhagen ............... 248/346.4 |
| 4,243,197 A | 1/1981 | Wright |
| 4,254,927 A * | 3/1981 | Stonhaus ................... 248/346.5 |
| D262,104 S | 12/1981 | Simpson |
| D271,328 S | 11/1983 | Lanier et al. |
| 4,480,748 A | 11/1984 | Wind |
| 4,484,661 A | 11/1984 | Evenson |
| 4,604,874 A | 8/1986 | Seeley |
| 4,606,278 A * | 8/1986 | Shuert ......................... 108/57.27 |
| 4,653,651 A | 3/1987 | Flum |
| 4,687,604 A * | 8/1987 | Goettl ............................. 261/29 |
| 4,733,790 A | 3/1988 | Stein |
| 4,783,971 A | 11/1988 | Alba |
| 4,814,752 A | 3/1989 | Lehman |
| 4,835,984 A | 6/1989 | Vyavaharkar |
| 4,869,456 A | 9/1989 | Jacobs |
| 4,879,956 A * | 11/1989 | Shuert .......................... 108/53.3 |
| 4,917,581 A | 4/1990 | Richardson |
| D308,247 S | 5/1990 | Adam |
| 4,930,632 A | 6/1990 | Eckert |
| D309,571 S | 7/1990 | Lehman |
| 5,076,534 A | 12/1991 | Adam |
| 5,147,039 A | 9/1992 | Sechler et al. |
| 5,226,293 A * | 7/1993 | Brock ............................. 62/304 |
| 5,230,601 A | 7/1993 | Apps et al. |
| 5,249,699 A | 10/1993 | Williams |
| 5,307,931 A * | 5/1994 | Gillispie et al. .............. 206/386 |
| D353,665 S | 12/1994 | Jennings |
| 5,392,944 A | 2/1995 | Jennings |
| 5,429,236 A | 7/1995 | Evans |
| D368,409 S | 4/1996 | Schwartz |
| 5,579,700 A * | 12/1996 | Nuechterlein et al. ........ 108/55.1 |
| 5,722,626 A * | 3/1998 | Menchetti et al. ........ 248/346.01 |
| 5,749,555 A * | 5/1998 | Albrecht ................... 248/346.01 |
| 5,788,346 A * | 8/1998 | Jacobson et al. .............. 312/108 |
| D399,095 S | 10/1998 | Schmidt |
| 5,881,566 A | 3/1999 | Shacklock et al. |
| 5,895,025 A | 4/1999 | Alesi |
| 5,961,093 A | 10/1999 | Jones |
| 5,966,881 A * | 10/1999 | Kitagaki ...................... 52/293.3 |
| 6,044,592 A * | 4/2000 | Strieter ............................. 52/27 |
| 6,065,531 A | 5/2000 | Schneider |
| D426,110 S | 6/2000 | Schmidt |
| D431,958 S | 10/2000 | Harris |
| 6,286,328 B1 | 9/2001 | Kawahara |
| 6,289,823 B1 * | 9/2001 | Koefelda et al. .............. 108/53.3 |
| 6,345,474 B1 * | 2/2002 | Triplett ................... E02D 27/01 405/229 |
| 6,360,911 B1 | 3/2002 | Arnold |
| 6,382,108 B1 | 5/2002 | Stanek et al. |
| 6,668,735 B2 * | 12/2003 | Cassina ...................... 108/57.25 |
| 6,718,788 B1 | 4/2004 | Shuck |
| 6,719,164 B2 * | 4/2004 | Maschio ........................ 220/571 |
| 6,766,615 B2 | 7/2004 | Smead |
| D496,058 S | 9/2004 | Sargent et al. |
| 6,797,894 B2 | 9/2004 | Montagnino et al. |
| 6,868,689 B1 | 3/2005 | McNeil et al. |
| 6,928,933 B2 * | 8/2005 | Grau .......................... 108/57.25 |
| 6,971,320 B1 * | 12/2005 | Maldonado-Cortes et al. ............................ 108/55.3 |
| 6,976,435 B2 * | 12/2005 | Lucas et al. ................. 108/51.11 |
| 6,976,437 B2 * | 12/2005 | Fisch et al. ................. 108/57.25 |
| 6,978,909 B2 | 12/2005 | Goetzinger |
| D562,963 S * | 2/2008 | Cantolino ..................... D23/386 |
| D590,123 S | 4/2009 | Hermans |
| D590,124 S | 4/2009 | Hermans |
| D590,572 S | 4/2009 | Hermans |
| D590,573 S | 4/2009 | Hermans |
| D600,874 S | 9/2009 | Hermans |
| D600,875 S * | 9/2009 | Hermans ......................... D34/38 |
| D608,917 S | 1/2010 | Ward et al. |
| 7,850,898 B1 | 12/2010 | Rowley |
| 7,854,141 B1 | 12/2010 | Breen |
| 7,891,635 B2 * | 2/2011 | Rowland ........................ 248/678 |
| 7,900,795 B1 * | 3/2011 | Cantolino ...................... 220/608 |
| 8,152,129 B2 * | 4/2012 | Hermans et al. .............. 248/678 |
| 2002/0185579 A1 * | 12/2002 | Henning ................... 248/346.02 |
| 2005/0247851 A1 * | 11/2005 | Kessler et al. ................. 248/678 |
| 2006/0144071 A1 * | 7/2006 | Rowland .......................... 62/285 |
| 2008/0029864 A1 | 2/2008 | Pyo et al. |
| 2009/0302185 A1 * | 12/2009 | Rowland .................... 248/346.2 |
| 2010/0207004 A1 | 8/2010 | Hermans et al. |

FOREIGN PATENT DOCUMENTS

| | | |
|---|---|---|
| KR | 200402748 | 12/2005 |
| WO | WO0039512 | 7/2000 |
| WO | 03064239 A1 | 8/2003 |
| WO | 2007068036 | 6/2007 |

OTHER PUBLICATIONS

Final Office Action and Notice of References Cited, mailed for U.S. Appl. No. 11/320,992 on Jun. 5, 2008.
Advisory Action, mailed for U.S. Appl. No. 11/320,992 on Sep. 3, 2008.
Non-final Office Action and Notice of References Cited, mailed for U.S. Appl. No. 11/320,992 on Dec. 19, 2008.
Examiner Interview Summary, mailed for U.S. Appl. No. 11/320,992 on Mar. 24, 2009.
Non-final Office Action and Notice of References Cited, mailed for U.S. Appl. No. 11/833,298 on Dec. 23, 2009.
Final Office Action, mailed for U.S. Appl. No. 11/833,298 on Jun. 24, 2010.
Advisory Action, mailed for U.S. Appl. No. 11/833,298 on Aug. 26, 2010.
Examiner Interview Summary, mailed for U.S. Appl. No. 11/833,298 on Sep. 8, 2010.
Notice of Allowance, mailed for U.S. Appl. No. 11/833,298 on Oct. 19, 2010.
Final Office Action for U.S. Appl. No. 11/320,992, mailed Sep. 16, 2009.
Interview Summary for U.S. Appl. No. 11/320,992, mailed Oct. 26, 2009.
Non-final Office Action and Notice of References cited for U.S. Appl. No. 11/320,992, mailed Dec. 8, 2009.
Final Office Action and Notice of References cited for U.S. Appl. No. 11/320,992, mailed on Jul. 6, 2009.
Final Office Action and Notice of References cited for U.S. Appl. No. 11/320,992, mailed May 19, 2010.
Advisory Action for U.S. Appl. No. 11/320,992 mailed Jun. 9, 2010.
Final Office Action for U.S. Appl. No. 11/320,992 mailed Jul. 12, 2010.
Advisory Action for U.S. Appl. No. 11/320,992, mailed Aug. 30, 2010.
Examiner Interview Summary for U.S. Appl. No. 11/320,992, mailed Jul. 7, 2010.
Non-final Office Action and Notice of References cited for U.S. Appl. No. 11/320,992, mailed Jan. 5, 2010.

* cited by examiner

EQUIPMENT PAD THAT INCLUDES ONE OR MORE RISERS

CROSS-REFERENCE TO RELATED APPLICATIONS

The present application is a continuation-in-part of U.S. application Ser. No. 11/833,298, filed Aug. 3, 2007, which claims the benefit of U.S. Application No. 60/821,414, filed Aug. 4, 2006, both of which are incorporated herein by reference in their entirety.

TECHNICAL FIELD

The present application generally relates to an equipment pad and more particularly relates to an equipment pad that includes a riser for supporting an air handling unit.

BACKGROUND OF THE INVENTION

Equipment units such as air conditioning condensers and heat pumps are commonly used to heat and cool the interior spaces of homes and small commercial buildings. Typically, the equipment unit is installed on an exterior of the home or building on the ground or roof surface. So that the equipment unit is elevated above the ground or roof, apart from any water or landscaping material thereon, an equipment pad may be positioned between the equipment unit and the ground or roof. The equipment pad may be made from a material such as concrete, plastic or a composite.

To increase airflow to the equipment unit and reduce obstruction due to snow, ice, landscaping matter, or other materials, the equipment unit may be elevated above the pad using a riser. A variety of objects are frequently used as risers, including lumber, cap stones, cinder blocks, and plastic cones or cylinders. The risers often appear unattractive and unstable to the average consumer. Additionally, the average installer can have difficulty placing a unit on four independent risers with mastic on top to hold the unit in place. Moreover, the need for separate risers increases not only the material cost of an installed condensing unit, but also the time and labor costs for sourcing, carrying, and installing the risers.

Accordingly, there is a desire for an equipment pad that includes a riser that adequately and safely supports a condensing unit. There also is a need for an equipment pad that includes a riser that may be easily shipped and stored.

SUMMARY OF THE INVENTION

An equipment pad for elevating an equipment unit includes a base and a number of riser portions. The base includes a base surface that extends laterally outward and a base opening formed completely through the base surface. The riser portions extend upward from the base surface to elevate and support the equipment unit. Together the riser portions define a single, continuous riser. Each riser portion includes a top surface portion, a side wall portion, and an interior portion. The top surface portion is substantially level and substantially continuous. The side wall portion tapers inward and extends upward from the base surface to the riser top surface portion, elevating the riser top surface portion above the base surface. The interior portion, which is defined between the top surface portion and the side wall portion, is substantially hollow. At least one of the riser portions forms an angle with reference to an adjacent riser portion such that the riser includes at least one turn. The riser top surface portions together define a substantially level support surface for receiving the equipment unit, and the riser interior portions align with the base opening so that the equipment pad is stackable with another similarly shaped equipment pad.

In such embodiments, the base and the riser portions may be integrally formed to define a unibody structure. A drainage channel may be defined between at least two riser portions, and a bulwark may be positioned at an end of the drainage channel. The single, continuous riser may form an open curve with disconnected end points. The single, continuous riser may have a tortuous shape, which may be a spiral shape in one embodiment. The base may have a height in the range of about ⅛ inch to about 3 inches, and each of the riser portions may have a height in the range of about 2 inches to about 15 inches.

Another equipment pad for elevating an equipment unit includes a base and a number of riser portions. The base includes a base surface that extends laterally outward and a base opening formed completely through the base surface. The riser portions extend upward from the base surface to elevate and support the equipment unit. Each riser portion includes a top surface portion, a side wall portion, and an interior portion. The top surface portion is substantially level and substantially continuous. The side wall portion tapers inward and extends upward from the base surface to the riser top surface portion, elevating the riser top surface portion above the base surface. The interior portion, which is defined between the top surface portion and the side wall portion, is substantially hollow. The riser portions include at least two elongated riser portions positioned adjacent to each other and at least one connecting riser portion that connects the elongated riser portions to form a single, continuous riser section. The riser top surface portions together define a substantially level support surface for receiving the equipment unit, and the riser interior portions align with the base opening so that the equipment pad is stackable with other similarly shaped equipment pads.

In such embodiments, the base and the riser portions may be integrally formed to define a unibody structure. A drainage channel may be defined within the single, continuous riser section. The connecting riser portion may include an elbow shape or an arc shape. The base may have a height in the range of about ⅛ inch to about 3 inches, and each of the riser portions may have a height in the range of about 2 inches to about 15 inches.

An additional equipment pad for elevating an equipment unit includes a base and a riser. The base includes a base surface that extends laterally outward and a base opening formed completely through the base surface. The riser forms an open curve having disconnected end points and extends upward from the base to elevate and support the equipment unit. The riser includes a top surface portion, a side wall portion, and an interior portion. The top surface portion is substantially level and substantially continuous. The side wall portion extends upward from the base surface to the top surface portion, elevating the top surface portion above the base surface. The side wall portion also tapers inward. The interior portion, which is defined between the top surface portion and the side wall portion, is substantially hollow. Thb interior portion aligns with the base opening so that the equipment pad is stackable with another similarly shaped equipment pad.

In such embodiments, the base and the riser may be integrally formed to define a unibody structure. A drainage channel may be defined within the open curve of the riser, and a bulwark may be positioned at an end of the drainage channel. The base may have a height in the range of about ⅛ inch to about 3 inches, and the riser may have a height in the range of about 2 inches to about 15 inches. The open curve may form a tortuous shape, which may be a spiral.

DETAILED DESCRIPTION OF THE INVENTION

The present application now will be described more fully hereinafter with reference to the accompanying drawings, in which several embodiments of the application are shown. This application may, however, be embodied in many different forms and should not be construed as limited to the embodiments set forth herein. Like numbers refer to like elements throughout the drawings.

Figure 1:
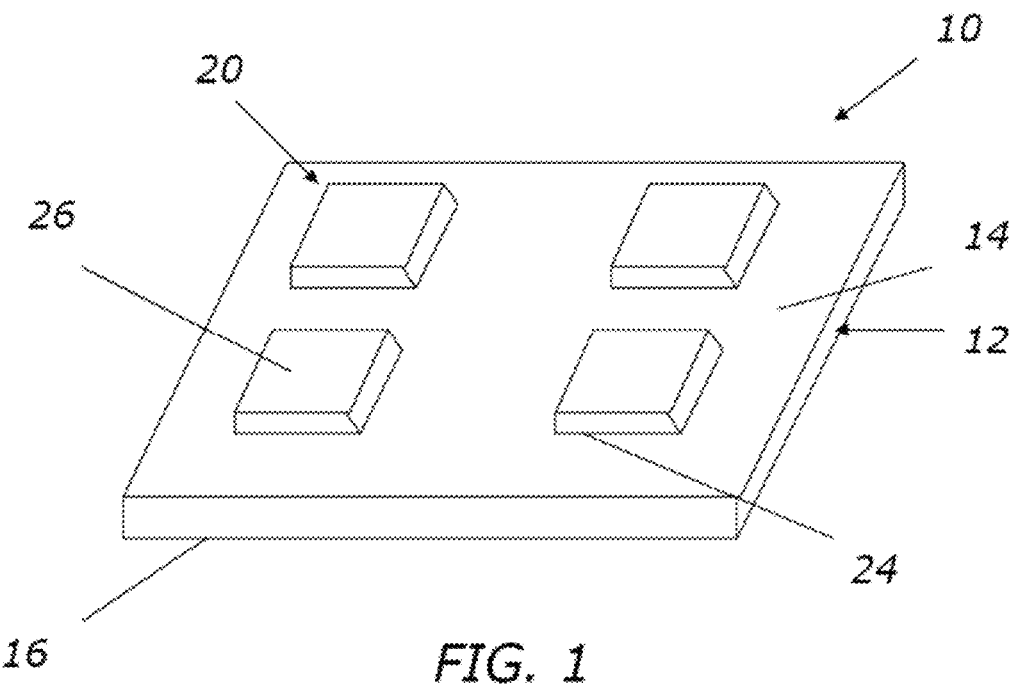
FIG. 1 is a perspective view of an equipment pad with a plurality of integrated risers according to an embodiment of the application.
Figure 3:
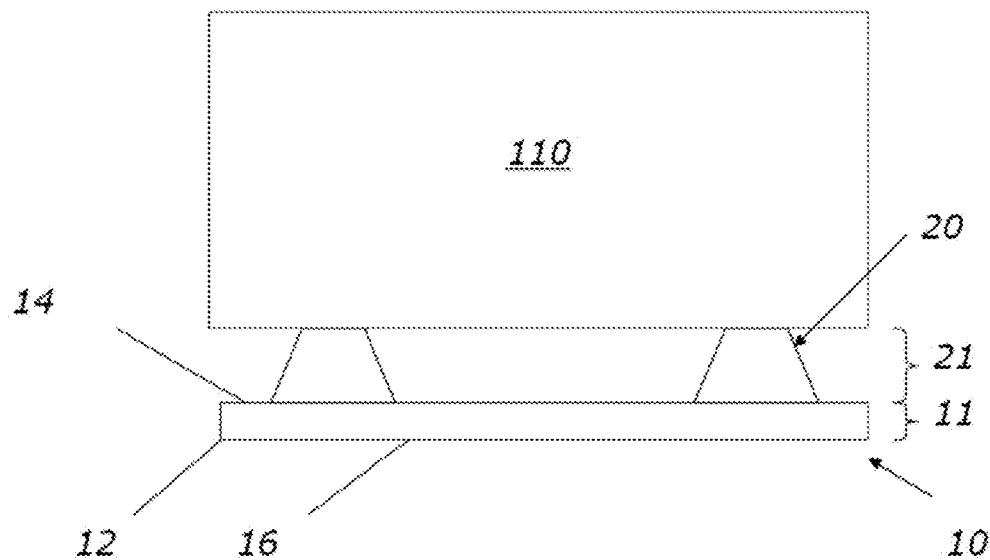
FIG. 3 is a perspective view of an equipment pad with a plurality of integrated risers supporting a condensing unit according to an embodiment of the application.

FIGS. 1 and 3 illustrate exemplary embodiments of the equipment pad 10. The equipment pad 10 may include a base 12, a top surface 14 of the base, and a bottom surface 16 of the base. The base 12 may be any shape adequate for use with a condensing unit 110. It will be appreciated that the base 12 may be rectangular, square, circular, polygonal, or any other shape.

The equipment pad 10 may be made of any material with suitable weight and strength requirements including but not limited to plastic. In an exemplary embodiment, the equipment pad 10 is made of plastic with a base height 11 of up to approximately 3 inches. In another exemplary embodiment, the equipment pad 10 is made of plastic with a base height 11 of approximately one eighth to one half of an inch. One of ordinary skill in the art will appreciate that the equipment pad 10 is not limited to plastic and the base height 11 is not limited to the range of one eighth of an inch to 3 inches.

Furthermore, the equipment pad 10 may be any size suitable for use under a condensing unit 110. Typical equipment pads have dimensions in the range of approximately 16×36 inches to 60×67 inches. One of ordinary skill in the art will appreciate that the equipment pad 10 is not limited to these dimensional ranges and may be any size necessary to accommodate any condensing unit 110.

At least one riser 20 extends from the top surface 14 of the base 12. The riser 20 may extend substantially vertically from the top surface 14 of the base 12. In exemplary embodiments, a single riser 20 extends from the top surface 14 of the base 12. In other exemplary embodiments, the riser 20 may include a number of risers extending from the top surface 14 of the base 12. It should be understood that reference made herein to a riser 20 includes embodiments having a number of risers.

It is envisioned that the riser 20 may be of any height 21 desired to elevate properly a condensing unit 110. In an exemplary embodiment, the riser 20 extends to a height 21 in the range of approximately 2 inches to approximately 15 inches above the top surface 14 of the base 12. In another exemplary embodiment, the riser 20 extends to a height 21 in the range of approximately 3 inches to approximately 12 inches from the top surface 14 of the base 12. In yet another exemplary embodiment, the riser 20 extends to a height 21 of approximately 3 inches to approximately 6 inches from the top surface 14 of the base 12. In still yet another exemplary embodiment, the riser 20 extends to a height 21 of approximately 3 inches from the top surface 14 of the base 12.

Figure 2:
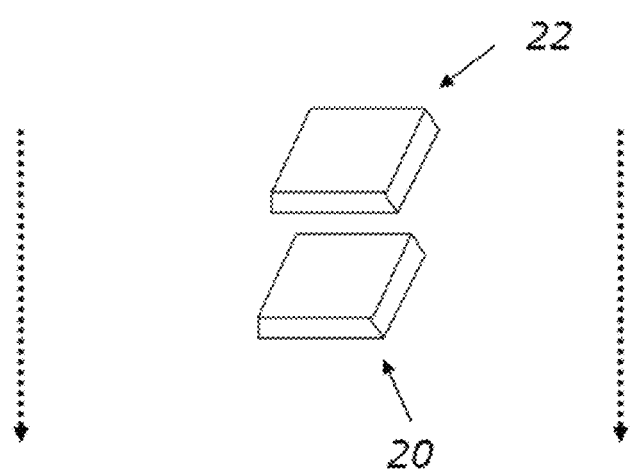
FIG. 2 is a perspective view of a riser with a separate riser cap according to an embodiment of the application.

As shown in the exemplary embodiment illustrated in FIG. 2, the height 11 of a riser 20 may be increased by adding at least one riser cap 22 to the top of the riser 20. The top of the riser 20 and bottom of the riser cap 22 may be connected together using a locking mechanism on the interior or exterior of the riser. Alternatively, the bottom of the riser cap 22 may be adhered to the top of the riser 20 using an adhesive.

The riser 20 may be positioned at any location on the top surface 14 of the base 12. In an exemplary embodiment, the riser 20 is positioned in substantially the center of the top surface 14 of the base 12. The position of the riser 20 is not limited to the center of the base 12 but may be off-center including on the periphery of the top surface 14 of the base, the corners of the base, or any other suitable location.

The riser 20 may be of any shape that is adequate for supporting a condensing unit 110. In an exemplary embodiment, the riser 20 may include a cylindrical shape. In another exemplary embodiment, the riser 20 comprises a polyhedron shape. In yet another exemplary embodiment, the riser 20 may include an ellipsoidal shape.

In an exemplary embodiment, the riser 20 comprises side members 24 that support the top 26 of the riser 20. The side members 24 of the riser 20 may be any shape including rectangular, triangular, conical or any other shape. Further, the riser 20 may include other support structures to assist in the supporting of the condensing unit 110. In one exemplary embodiment, the riser 20 further comprises ribbing in the top of the riser for added support (not pictured). It is contemplated that the ribbing is not necessary if the riser 20 can provide sufficient support without the ribbing.

In an exemplary embodiment, the riser 20 terminates in oval or round footprints on the bottom surface 16 of the base 12 to assist with leveling and support. Additional footprints may be added to the center of the equipment pad 10 depending on the size of the equipment pad 10. Alternatively, the riser 20 may extend beyond the bottom surface 16 of the base 12, thereby providing structural and ground support. In another exemplary embodiment, the bottom surface 16 of the base 12 may include ribbing (not pictured). In yet another exemplary embodiment, insert feet, or any equivalent molded structure, may be added under the riser 20 to increase the ground contact of the equipment pad 10, allowing the ribbing on the base 12 of the equipment pad 10 to be reduced, while still allowing for the nesting of the riser 20. It is further contemplated that the ribbing can be replaced by arcs or curbed beams of plastic, depending on what amount of plastic is necessary to prevent warping during production and to address other related structural issues.

Figure 4:
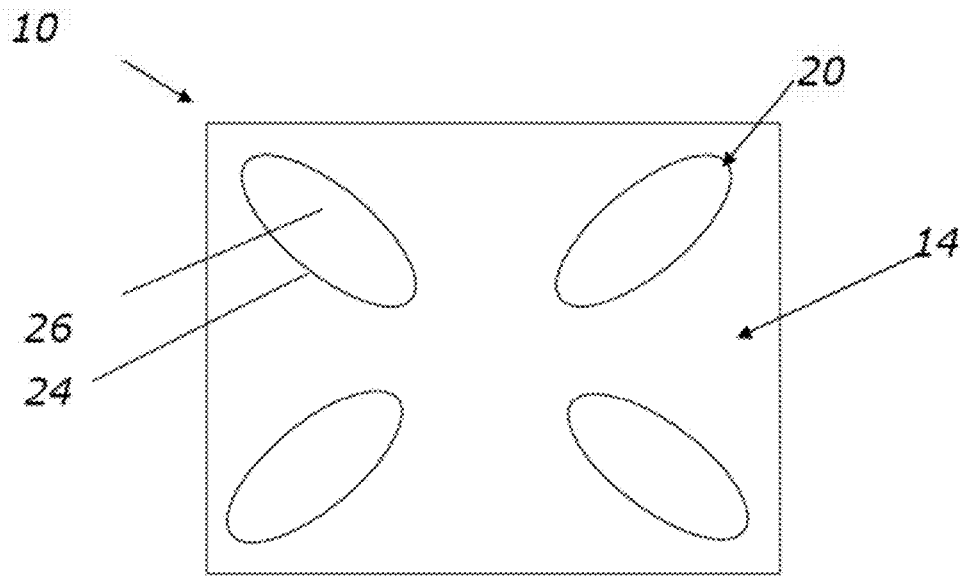
FIG. 4 is a perspective view of an equipment pad with a plurality of integrated risers according to an embodiment of the application.
Figure 5:
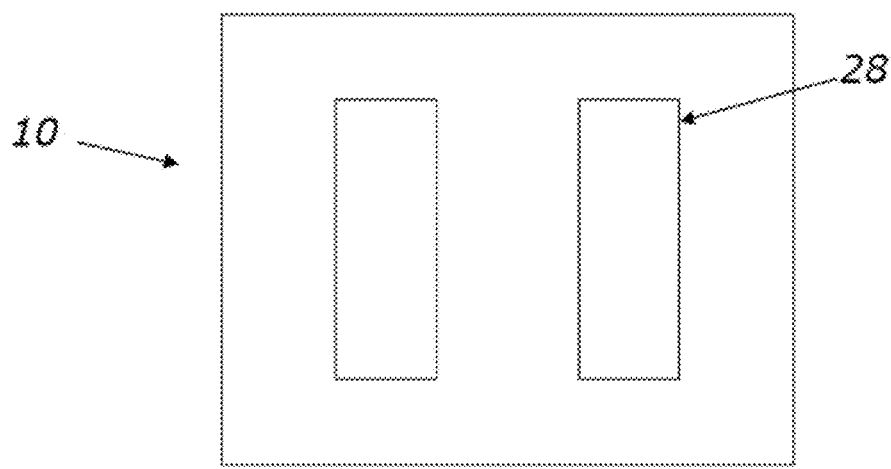
FIG. 5 is a perspective view of an equipment pad with a plurality of integrated risers according to an embodiment of the application.
Figure 6:
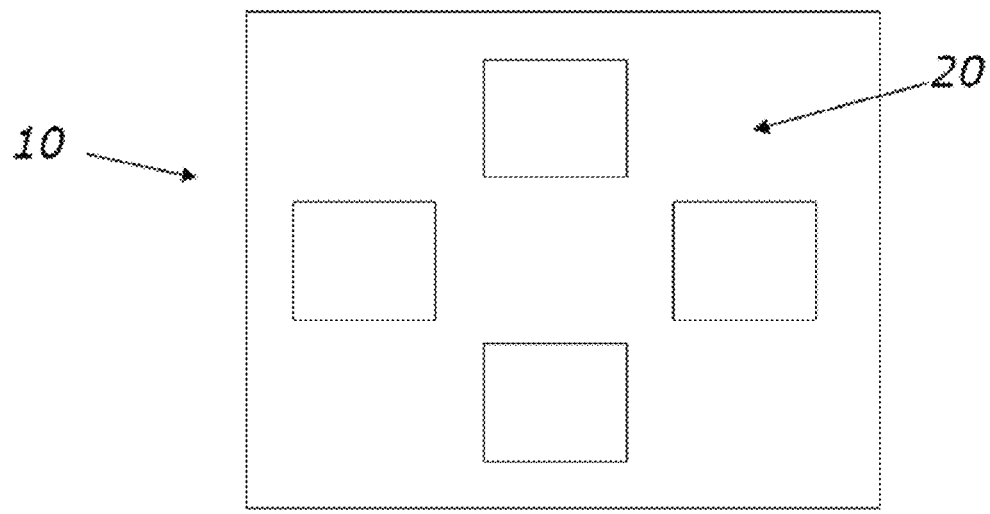
FIG. 6 is a perspective view of an equipment pad with a plurality of integrated risers according to an embodiment of the application.

The equipment pad 10 may include a number of risers 20, as illustrated in an exemplary embodiment in FIG. 4. The plurality of risers 20 may be positioned in any configuration adequate for supporting a condensing unit. In an exemplary embodiment, the equipment pad 10 may include two risers 20 each positioned substantially on opposite sides of the top surface 14 of the base (FIG. 5). In another exemplary embodiment, the equipment pad 10 may include four risers 20 each positioned substantially in a corner of the top surface 14 of the base 12 (FIG. 4). In still another exemplary embodiment, the equipment pad 10 may include four risers 20 each positioned substantially in the center of the periphery of the top surface 14 of the base 12 (FIG. 6). One of ordinary skill in the art will appreciate that any number of risers 20 is contemplated herein and that the number of risers may be positioned in any configuration on the top surface 14 of the base 12. Furthermore, one of ordinary skill in the art will appreciate that the number of risers 20 may have the same height or different heights.

The plurality of risers 20 may be positioned in any configuration including substantially rectangular, square, circular, oval, pyramidal or any other configuration that provides sufficient support to condensing units 110. In an exemplary embodiment illustrated in FIG. 5, the equipment pad 10 includes two substantially rectangular polyhedron shaped risers 28 positioned on opposite sides of the top surface 14 of the base 12. In another exemplary embodiment, the equipment pad 10 includes a number of risers 20 positioned in a substantially rectangular position. In yet another exemplary embodiment, the equipment pad 10 includes a plurality of risers 20 positioned in a substantially triangular position.

The riser 20 may be substantially hollow or solid. The hollow riser provides a lighter equipment pad 10 than would a solid riser 20.

The riser 20 is affixed to the base 12 of the equipment pad 10. In an exemplary embodiment, the riser 20 is preformed with the base 12 of the equipment pad 10 as a unibody structure. The unibody equipment pad 10 may be manufactured through the use of molds or any other manufacturing technique. In another exemplary embodiment, the riser 20 and the base 12 are formed separately and the riser 20 is then affixed to the top surface 14 of the base of the equipment pad 10.

Figure 7:
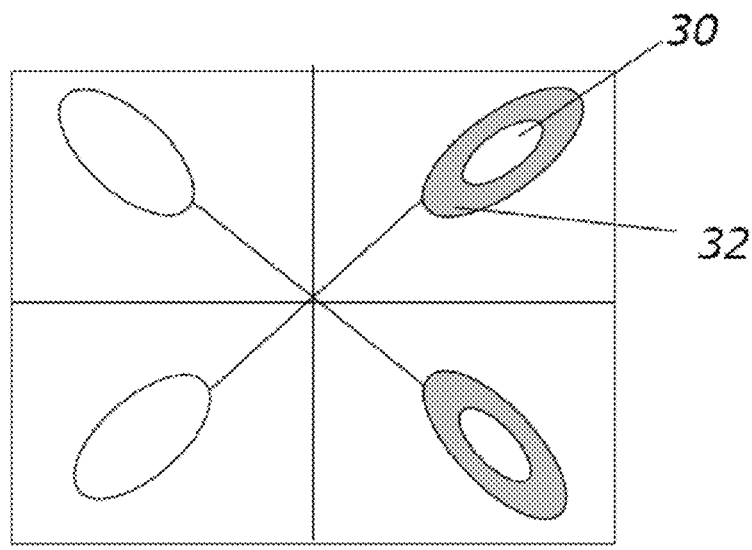
FIG. 7 is a perspective view of the bottom surface of an equipment pad with a plurality of hollow risers according to an embodiment of the application.

FIG. 7 illustrates an exemplary embodiment of the equipment pad 10 with the hollow riser 20. The bottom surface 16 of the base 12 provides openings 30 aligned with the risers 20 and insert feet 32 to increase the ground contact of the equipment pad 10. It should be apparent to those skilled in the art that the position, shape, and number of risers 20 will result in different configurations of the bottom surface 16 of the base 12.

Figure 8:
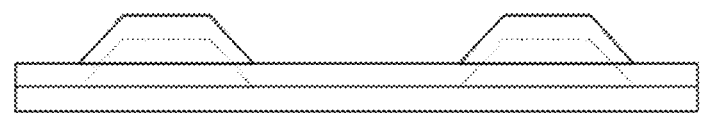
FIG. 8 is a perspective view of a first equipment pad with a plurality of integrated risers stacked with a second equipment pad with a plurality of integrated risers according to an embodiment of the application.

As shown in FIG. 8, the openings 30 allow a number of equipment pads 10 of the same configuration to be stacked or nested together. The number of equipment pads 10 may be stacked or nested by interfacing the top surface 14 of the base 12 and the riser 20 of a first equipment pad 10 with a bottom surface 16 of a base and the riser 20 of a second equipment pad 10. The stackable or nestable utility of the equipment pad 10 allows a number of equipment pads to be stacked or nested together to aid in shipping, retail, or distribution of the equipment pads.

The riser 20 on the equipment pad 10 may be used to support the condensing unit 110 such that the condensing unit rests on the riser. Adhesive, or cushion, may be placed on top of the riser 20 so that the adhesive or cushion resides between the riser and the condensing unit 110 to further secure the condensing unit on the riser. In an exemplary embodiment, mastic adhesive is affixed to the top of the riser 20; however, any adhesive is contemplated herein.

An exemplary embodiment of this application also includes a method for elevating a condensing unit 110. An exemplary embodiment of the method for elevating a condensing unit 110 includes the steps of positioning an equipment pad 10 at a desired location for a condensing unit and positioning the condensing unit on the equipment pad, wherein the equipment pad includes a base 12 and at least one riser 20 affixed to the base, and wherein the at least one riser extends substantially vertically from the base to elevate and support the condensing unit.

FIGS. 9-21 illustrate additional embodiments of an equipment pad in accordance with the present disclosure. Like the embodiments of the equipment pad described above, the additional equipment pad embodiments may include a base portion and one or more riser portions. The base portion includes a surface that extends laterally outward, and the riser portions extend upward from the base portion. The riser portions elevate and support a piece of equipment, such as an air conditioning condenser or a heat pump, above the base portion. The riser portions include top surface portions and side walls. The side walls extend upward from the base surface to the top surface portions, elevating the top surface portions above the base surface. The top surface portions may be substantially level and together may define a substantially level support surface for receiving the equipment pad. In some embodiments, the riser portions taper inward and are hollow on the interior. For example, the riser side walls may taper inward from the base surface to the top surface portions. A riser interior portion, defined between the riser side walls and the top surface portion, may be substantially hollow. The riser portions may align with at least one opening formed completely through the base, so that the equipment pad can be stacked with another similarly shaped equipment pad, such as by passing the riser portions of one equipment pad through the base openings of another equipment pad into the interior of its riser portions.

Figure 9:
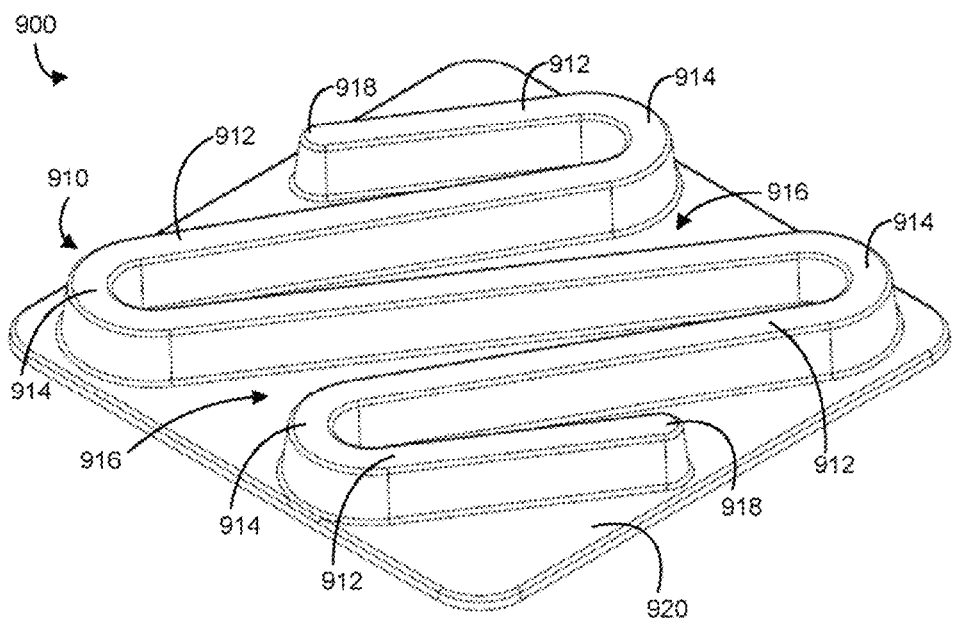
FIG. 9 is a perspective view of an embodiment of an equipment pad that includes a riser.

Any two of the riser portions may be disassociated or associated with each other. Some riser portions may be completely spaced apart from each other, forming disparate or segregated risers, while other riser portions may be linked or connected to each other, forming a continuous or seemingly continuous riser. Any combination of discrete riser portions or connected riser portions may be used to form one or more risers for supporting the equipment unit. For example, FIG. 1 shows a number of riser portions that are discrete from each other to form different risers, while FIG. 9 shows a number of riser portions that connect to each other to form a single riser. It should be noted that a single riser may be formed from continuous or integral portions or from separate portions positioned adjacent to each other in an abutting or linking fashion.

The riser or risers may be configured and positioned to adequately support the equipment unit, providing at least three discrete contact points for the equipment unit so that the weight of the unit can be transferred to the ground. More particularly, the top surfaces of the riser portions may define a plane within which the equipment is supported in at least two perpendicular directions. For example, the equipment pad shown in FIG. 1 includes four discrete risers that provide four discrete contact points for the equipment unit, in perpendicular length-wise and depth-wise directions, while the equipment pad shown in FIG. 9 includes a serpentine riser that provides contact points for the supported equipment in a number of perpendicular directions.

Figures 10, 11:
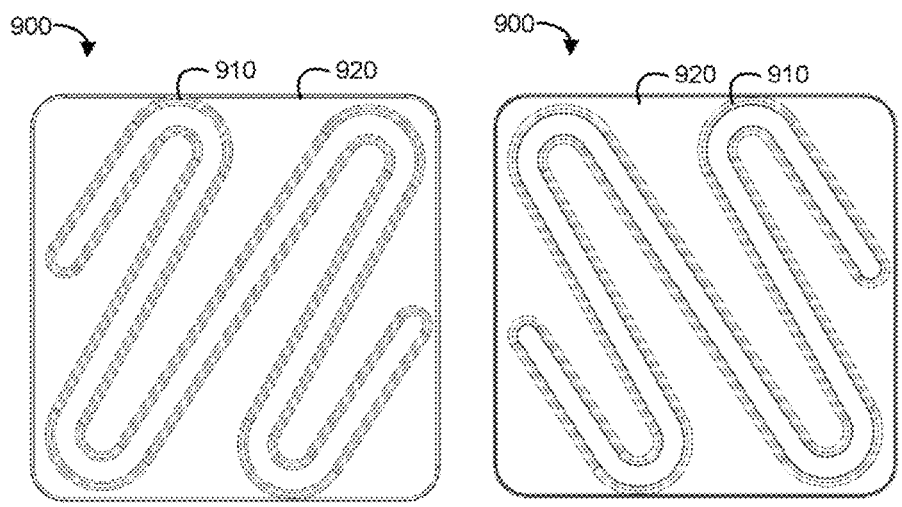
FIG. 10 is a top plan view of the equipment pad shown in FIG. 9.
FIG. 11 is a bottom plan view of the equipment pad shown in FIG. 9.

More particularly, FIGS. 9-11 are perspective, top, and bottom views of an embodiment of an equipment pad 900 having a single riser 910 winding across its base 920. The riser 910 is formed from a number of elongated riser portions 912 and a number of connecting riser portions 914. The elongated riser portions 912 span a portion of the base 920, while the connecting riser portions 914 connect adjacent elongated riser portions 912 to form the continuous riser 910. The connecting riser portion 914 forms an angle with reference to the elongated riser portion 912, so that the riser includes a turn. Thus, the riser 910 is able to curve so that the equipment unit is supported at three or more contact points in the plane of support defined by the top surfaces of the riser portions. More particularly, the riser 910 forms an open curve having two disconnected end points 918. Because the curve is open, drainage channels 916 may be defined between adjacent riser portions, and drainage descending from the supported equipment may flow along the drainage channel 916 from the equipment pad. Thus, drainage can flow outward.

In the embodiment shown in FIG. 9, the elongated riser portions 912 are substantially straight and the connecting riser portions 914 are substantially arc shaped, although other configurations are possible. For example, the elongated riser portions may curve, and the connecting riser portions may be substantially straight, curved, arc shaped, or elbow shaped. Any combination can be employed.

Figure 12:
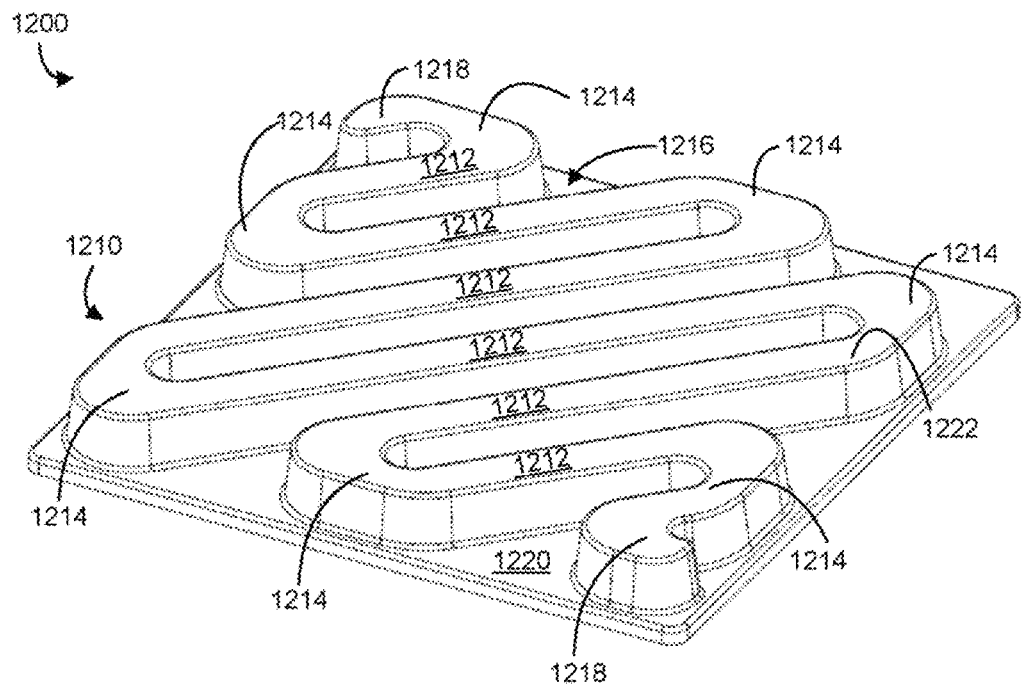
FIG. 12 is a perspective view of another embodiment of an equipment pad that includes a riser.
Figure 13:
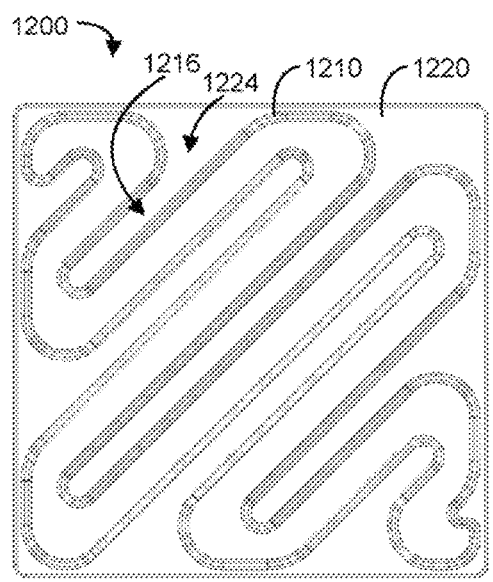
FIG. 13 is a top plan view of the equipment pad shown in FIG. 12.
Figure 14:
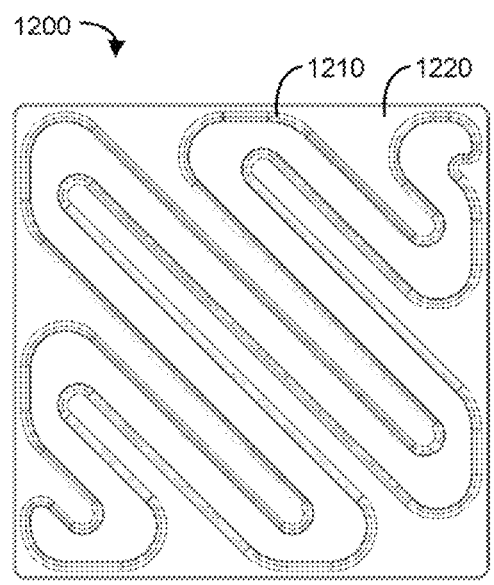
FIG. 14 is a bottom plan view of the equipment pad shown in FIG. 12.

An example is shown in FIGS. 12-14, which are perspective, top, and bottom views of another embodiment of an equipment pad 1200. As shown, a single continuous riser 1210 is formed from a number of elongated riser portions 1212 and a number of connecting riser portions 1214, but in this embodiment the connecting riser portions 1214 are relatively straight, curving only at the connections to the elongated riser portions 1212. The connecting riser portions 1214 also lie generally parallel to a perimeter of the base 1220, increasing the top surface 1222 of the riser 1210 about the perimeter of the equipment pad 1200 to better support the equipment unit. Additionally, two of the connecting riser portions 1214 occupy corners of the equipment pad, and the open curve forms hook-shaped end portions 1218 in opposite corners of the pad 1200, increasing the top surface 1222 of the riser 1210 in corners of the equipment pad 1200 to better support the equipment unit, although other configurations are possible.

Figure 15:
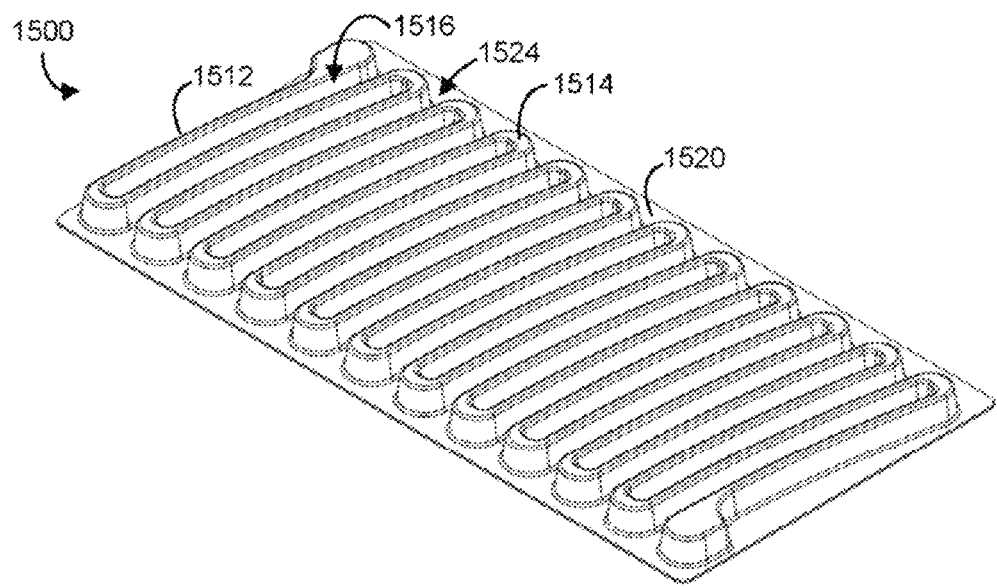
FIG. 15 is a perspective view of another embodiment of an equipment pad that includes a riser.
Figure 16:
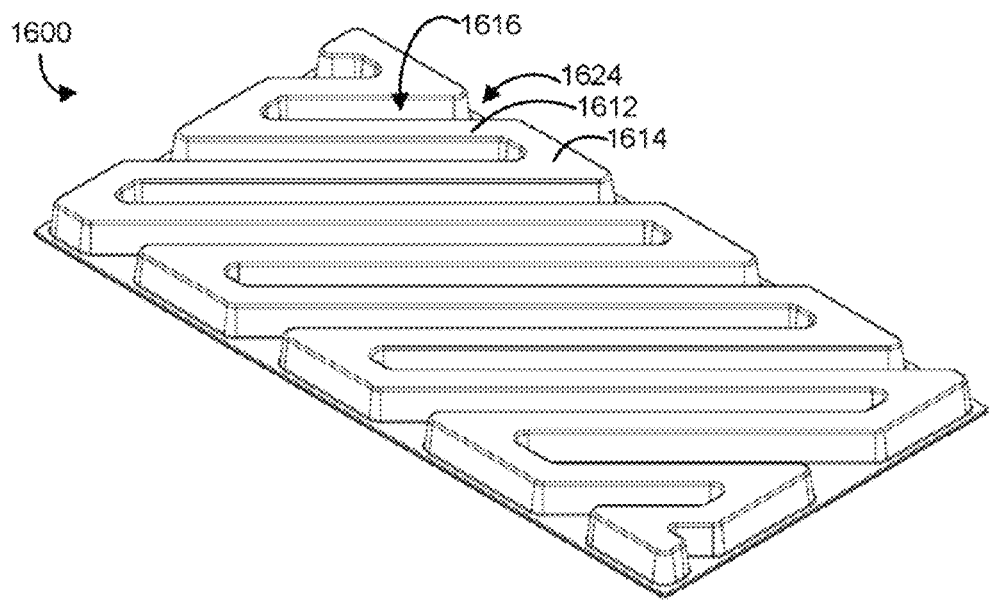
FIG. 16 is a perspective view of another embodiment of an equipment pad that includes a riser.

FIGS. 15 and 16 illustrate additional equipment pad embodiments 1500 and 1600, respectively. In both embodiments, the elongated riser portions traverse substantially the entire width of the equipment pad between opposite edges. As shown in FIG. 15, the elongated riser portions 1512 may be slightly curved and the connecting riser portions 1514 may be arc-shaped, and as shown in FIG. 16, the elongated riser portions 1612 may be substantially straight and the connecting riser portions 1614 may be substantially straight. Any combination may be employed, and again, the riser portions that form the ends of the open curve may have an increased surface area for further supporting the equipment unit.

Figure 17:
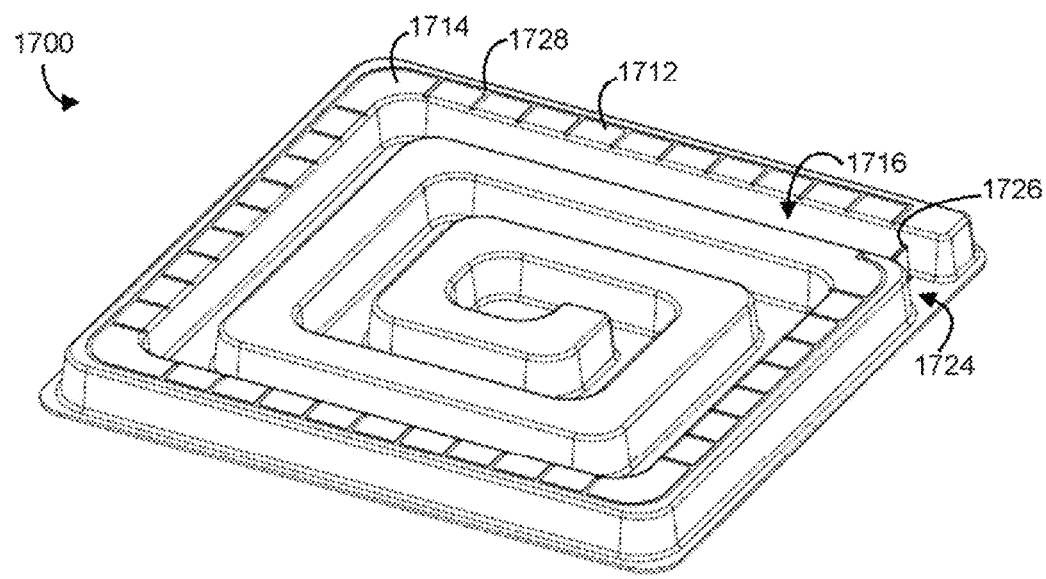
FIG. 17 is a perspective view of another embodiment of an equipment pad that includes a riser.
Figure 18:
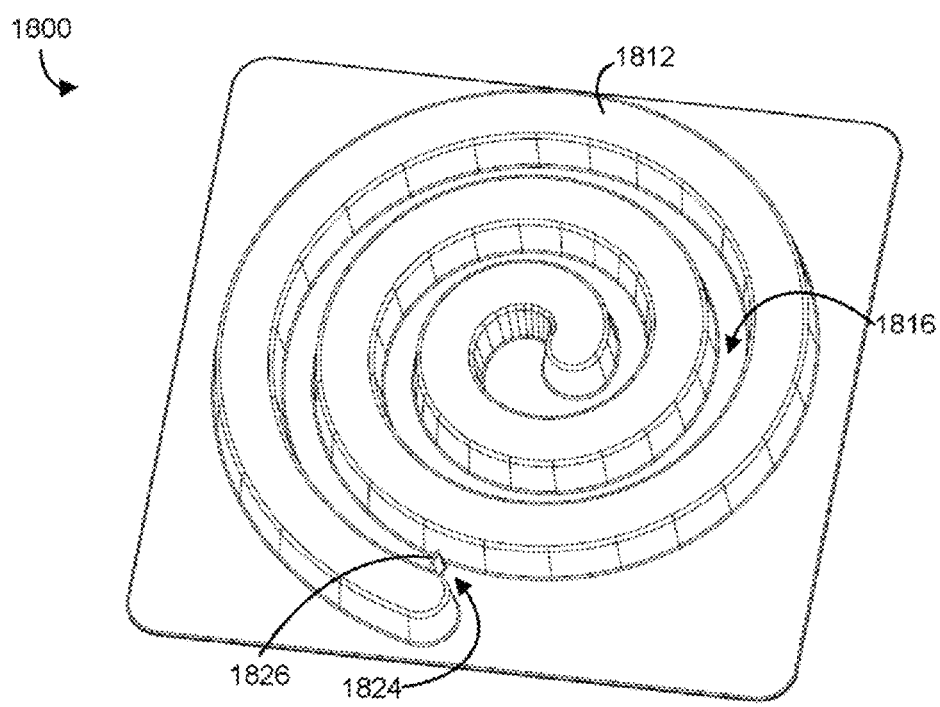
FIG. 18 is a perspective view of another embodiment of an equipment pad that includes a riser.

FIGS. 17 and 18 illustrate embodiments of equipment pads 1700 and 1800, respectively, that form an open curve in the shape of a spiral. In the embodiment of FIG. 17, relatively straight elongated riser portions 1712 are connected by elbow-shaped connecting riser portions 1714 to form a square spiral, while in FIG. 18, the elongated riser portions 1812 continuously join to form a circular spiral. Combinations of square, rectangular, oval, and circular spiral portions may be used to form other shapes in other embodiments.

Figure 19:
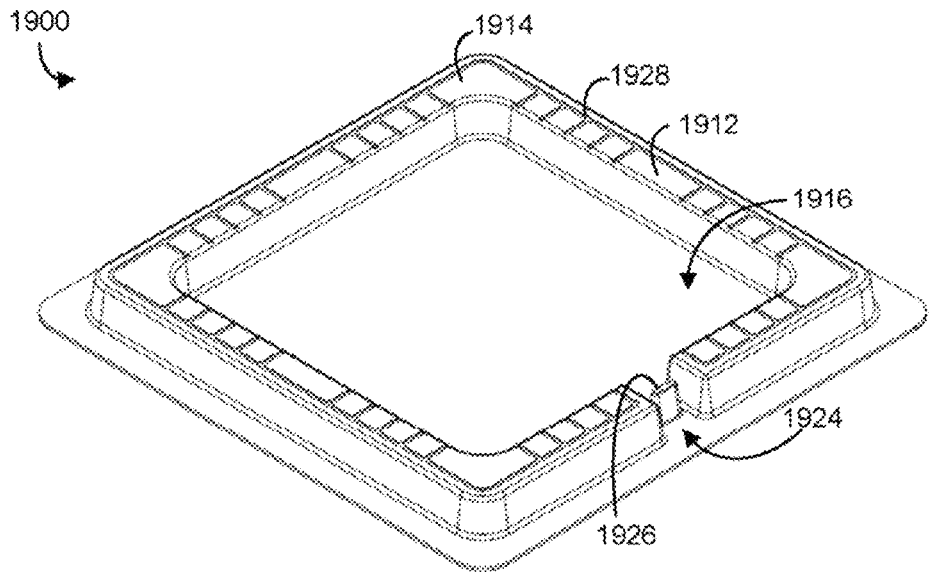
FIG. 19 is a perspective view of another embodiment of an equipment pad that includes a riser.
Figure 20:
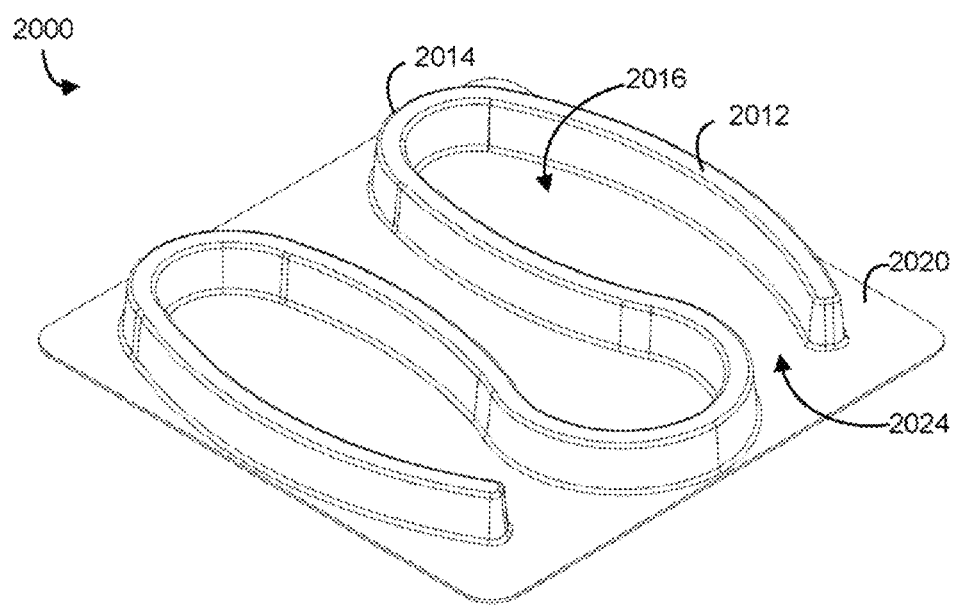
FIG. 20 is a perspective view of another embodiment of an equipment pad that includes a riser.

FIG. 19 illustrates an embodiment of an equipment pad formed from relatively straight elongated riser portions 1912 connected by elbow-shaped connecting riser portions 1914 into an open square. FIG. 20 illustrates an embodiment of an equipment pad having relatively curved elongated riser portions 2012 connected by a curved connecting riser portions 2014 into a double horse-shoe shape.

Any combination of these shapes and configurations can be combined to produce additional embodiments of an equipment pad with a single, continuous riser. So that the single, continuous riser traverses a sufficient expanse of the equipment pad to support the equipment unit, the riser may be tortuous, undulating, winding, and/or serpentine. The shape of the riser provides a universal fit for equipment units of varying sizes and shapes, which may overhang the riser. Even equipment units that are unevenly weighted may be adequately supported. It should be noted that, although the riser portions are shown with a relatively continuous width in many of the illustrated embodiments, any arrangement of varying widths may be employed. Also, each of the one or more risers may not be continuous but instead may be perforated, with the riser portions having slight spacers or openings formed there between.

The riser may form an open shape or curve having end points that are disconnected so that drainage can exit the equipment pad. Drainage channels are formed between adjacent riser portions so that drainage can be directed outward along the base toward an exit. Depending on the configuration of the equipment pad, one or more drainage exits may be provided. For example, in the embodiments shown in FIGS. 12, 15, 16, and 20, the drainage channels 1216, 1516, 1616, and 2016, respectively, are in communication with a number of different drainage openings 1224, 1524, 1624, and 2024, respectively, while in the embodiments of FIGS. 17, 18, and 19, the drainage channels 1716, 1816, and 1916, respectively, are in communication with a single drainage opening 1724, 1824, and 1924, respectively.

In some embodiments, the drainage opening may be associated with a pump or connector for reclaiming the drainage, such as for use in a toilet or other non-potable purpose. Also in some embodiments, a bulwark or tab may extend upward within the drainage opening. The bulwark or tab may inhibit debris and critters from entering the drainage channel while permitting fluid to exit. The bulwark or tab also may retain rocks or other filling material in the drainage channel, which may be placed therein to further anchor the equipment pad to the ground. Examples of bulwarks 1726, 1826 and 1926 are shown in FIGS. 17, 18 and 19, respectively.

In some embodiments, the top surfaces of the riser portions may be configured to facilitate drainage flow. The top surfaces of the riser portions may have slightly recessed channels for communicating drainage toward the riser sidewalls, so that the drainage can descend toward the base. The slightly recessed channels may have a slight angle or pitch to direct drainage along the top surfaces toward the side walls. Examples of slightly recessed channels 1728 and 1928 are shown in FIGS. 17 and 19, respectively. In embodiments in which the side walls of the riser portions taper outward such that the riser portions are narrower along the top than the bottom, the taper may facilitate directing the drainage downward. The base surface also may incorporate a slight pitch to facilitate drainage.

It should be noted that the base may have a range of configurations. For example, the base may have the configuration described above with reference to FIGS. 1-8, the base including a top surface, a bottom surface, a sidewall, and an interior. The interior may be solid, hollow, or partially or completely filled with another material, such as ribbing, arced or curved beams of plastic, or foam. Combinations of these interior configurations also are possible. Of course, one or more openings may extend through the base in alignment with the interiors of the riser portions in embodiments in which the equipment pad is stackable.

The riser may terminate at the top of the base, the bottom of the base, or anywhere in between. Terminating the riser at the bottom surface of the base may assist with leveling and support. Additionally, feet or another structure may be inserted into the riser to increase the ground contact of the equipment pad once placed in position, while still allowing for nestability.

Figure 21:
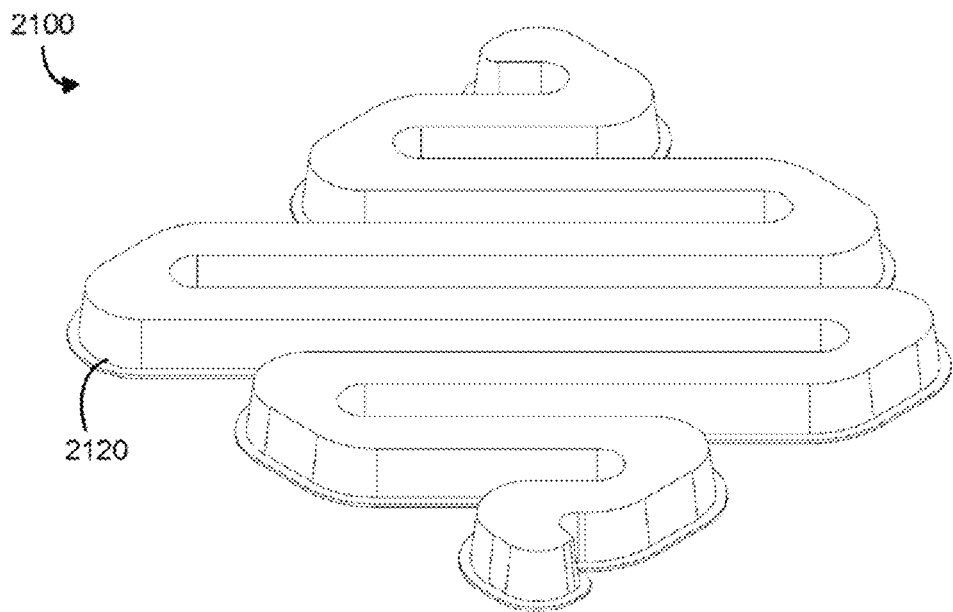
FIG. 21 is a perspective view of another embodiment of an equipment pad that includes a riser.

Examples are provided in the figures. For example, FIG. 9 illustrates a base 920 formed from a surface or sheet associated with a peripheral lip, and FIG. 15 illustrates a base 1520 formed from a surface or sheet without a lip. In such embodiments, the base surface includes any surface area extending between adjacent riser portions and any surface area extending laterally outward from the riser portions. In some embodiments, very little surface area may extend between or outward from the riser portions. FIG. 21 illustrates an example of such an equipment pad 2100, wherein the base 2120 is a slight lip extending about a lower periphery of the riser. The lip assists with transferring the weight of the equipment pad to the ground, although the lip may be omitted so that the equipment pad is substantially the riser. Such an equipment pad 2100 may be formed by extrusion, which may further reduce the cost of manufacturing. If extruded, the ends of the riser may be enclosed with separate end caps. Ribbing also may extend between adjacent riser portions to provide additional support, although the ribbing may not be necessary.

In some embodiments, the surfaces of the equipment pad may be relatively continuous or sealed, so that drainage escaping from the supported equipment cannot pass through the equipment pad but instead is routed along the equipment pad. For example, the base surface may have an integral or unibody structure with the riser or risers, or disparate components of the equipment pad may be assembled and sealed so that the surfaces of the pad join relatively continuously. The equipment pad may be formed by molding or extrusion, or through assembly of disparate parts. Materials such as polymers, plastics, composites, and/or concrete may be used.

Figure 22:
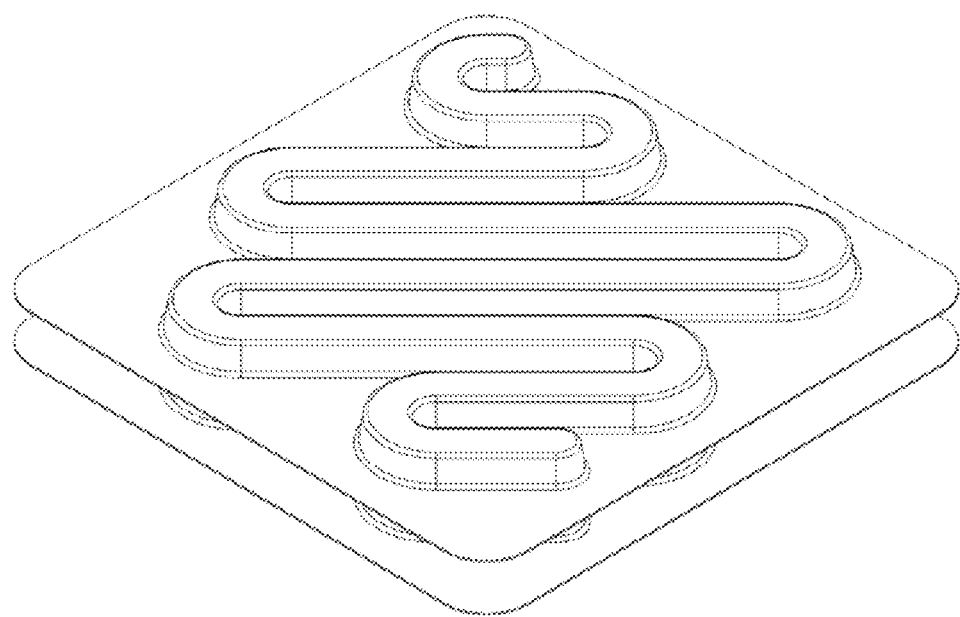
FIG. 22 is a perspective view of an embodiment of an equipment pad stacked with another similarly shaped equipment pad.

In embodiments, the equipment pad may be stackable. In such embodiments, the at least one riser defines a hollow interior that aligns with at least one opening formed completely through the base. The at least one riser may taper inwardly so that the riser of one equipment pad can be inserted through the base of another equipment pad. FIG. 22 illustrates an example of an embodiment that is stackable.

Embodiments of an equipment pad described above may provide robust ground support for a relatively heavy piece of equipment, such as an air conditioning condenser or a heat pump, while being relatively inexpensive. For example, the equipment pad may be formed from a low-cost material, a thin material, a lightweight material, or a material that encompasses all of these characteristics. The equipment pad may be molded into the desired shape for ease of manufacture, and the equipment pad may be stackable for ease of storage. Even in such cases, the equipment pad may adequately support the equipment unit and may adequately route its drainage in an appropriate direction.

It should be apparent that the foregoing relates only to exemplary embodiments of the present application and that numerous changes and modifications may be made herein without departing from the spirit and scope of the application as defined herein.

We claim:

1. An equipment pad for elevating an equipment unit about an exterior of a home or a building, the equipment pad comprising:
    a base comprising:
        a base surface that extends laterally outward;
        a base opening formed completely through the base surface; and
    a plurality of riser portions extending upward from the base surface to elevate and support the equipment unit, each riser portion comprising:
        a riser top surface portion that is substantially level and substantially continuous,
        a riser side wall portion extending upward from the base surface to the riser top surface portion, the riser side wall portion elevating the riser top surface portion above the base surface, the riser side wall portion tapering inward, and
        a riser interior portion defined between the riser top surface portion and the riser side wall portion, the riser interior portion being substantially hollow,
    wherein the plurality of riser portions together define a single, continuous riser, at least one of the riser portions forming an angle with reference to an adjacent riser portion such that the riser includes at least one turn, wherein the single, continuous riser consists of two disconnected end points,
    wherein the riser top surface portions together define a support surface for receiving the equipment unit, the support surface being substantially level, and
    wherein the riser interior portions are positioned over the base opening so that the equipment pad is stackable with another similarly shaped equipment pad such that a riser portion of another similarly shaped equipment pad is nestably stackable within the base opening and the riser interior portion of an adjacent equipment pad by passing the riser portions of one equipment pad through the base openings of another equipment pad and into the riser interior portion.

2. The equipment pad of claim 1, wherein the base and the plurality of riser portions are integrally formed to define a unibody structure.

3. The equipment pad of claim 1, further comprising a drainage channel defined between at least two riser portions, wherein the drainage channel directs drainage to one or more sides of the base.

4. The equipment pad of claim 3, further comprising a bulwark positioned at an exit end of the drainage channel.

5. The equipment pad of claim 1, wherein the single, continuous riser forms an open curve with disconnected end points.

6. The equipment pad of claim 1, wherein the single, continuous riser has a tortuous shape.

7. The equipment pad of claim 6, wherein the single, continuous riser has a spiral shape.

8. The equipment pad of claim 1, wherein:
the base comprises a height in the range of about 1/8 inch to about 3 inches; and each of the plurality of riser portions comprises a height in the range of about 2 inches to about 15 inches.

9. The equipment pad of claim 1, wherein the single, continuous riser comprises at least four elongated portions joined by at least three connecting portions.

10. An equipment pad for elevating a condensate-producing equipment unit about an exterior of a home or a building, the equipment pad comprising:
a base comprising:
a base surface that extends laterally outward;
a base opening formed completely through the base surface; and
a plurality of riser portions extending upward from the base surface to elevate and support the equipment unit, each riser portion comprising:
a riser top surface portion that is substantially level and substantially continuous,
a riser side wall portion extending upward from the base surface to the riser top surface portion, the riser side wall portion elevating the riser top surface portion above the base surface, the riser side wall portion tapering inward, and
a riser interior portion defined between the riser top surface portion and the riser side wall portion, the riser interior portion being substantially hollow,
wherein the plurality of riser portions together define a single, continuous riser comprising at least four elongated portions joined by at least three connecting portions, at least one of the plurality of riser portions forming an angle with reference to an adjacent riser portion such that the riser includes at least one turn, wherein the single, continuous riser consists of two disconnected endpoints,
wherein the riser top surface portions together define a support surface for receiving the equipment unit, the support surface being substantially level,
wherein at least two riser portions of the plurality of riser portions define a drainage channel therebetween such that the drainage channel directs drainage to one or more sides of the base, and
wherein the riser interior portions are positioned over the base opening so that the equipment pad is stackable with another similarly shaped equipment pad such that a riser portion of another similarly shaped equipment pad is nestably stackable within the base opening and the riser interior portion of an adjacent equipment pad by passing the riser portions of one equipment pad through the base openings of another equipment pad and into the riser interior portion.

11. An equipment pad for elevating an equipment unit about an exterior of a home or a building, the equipment pad comprising:
a base comprising:
a base surface that extends laterally outward to rest on soil outside of the home or building;
a base opening formed completely through the base surface; and
a plurality of riser portions extending upward from the base surface to elevate and support the equipment unit, each riser portion comprising:
a riser top surface portion that is substantially level and substantially continuous,
a riser side wall portion extending upward from the base surface to the riser top surface portion, the riser side wall portion elevating the riser top surface portion above the base surface, the riser side wall portion tapering inward, and
a riser interior portion defined between the riser top surface portion and the riser side wall portion, the riser interior portion being substantially hollow,
wherein the plurality of riser portions together define a single, continuous riser, at least one of the riser portions forming an angle with reference to an adjacent riser portion such that the riser includes at least one turn, wherein the single, continuous riser consists of two disconnected end points,
wherein the riser top surface portions together define a support surface for receiving the equipment unit, the support surface being substantially level, and
wherein the riser interior portions are positioned over the base opening so that the equipment pad is stackable with another similarly shaped equipment pad such that a riser portion of another similarly shaped equipment pad is nestably stackable within the base opening and the riser interior portion of an adjacent equipment pad by passing the riser portions of one equipment pad through the base openings of another equipment pad and into the riser interior portion.

* * * * *